UNITED STATES PATENT OFFICE.

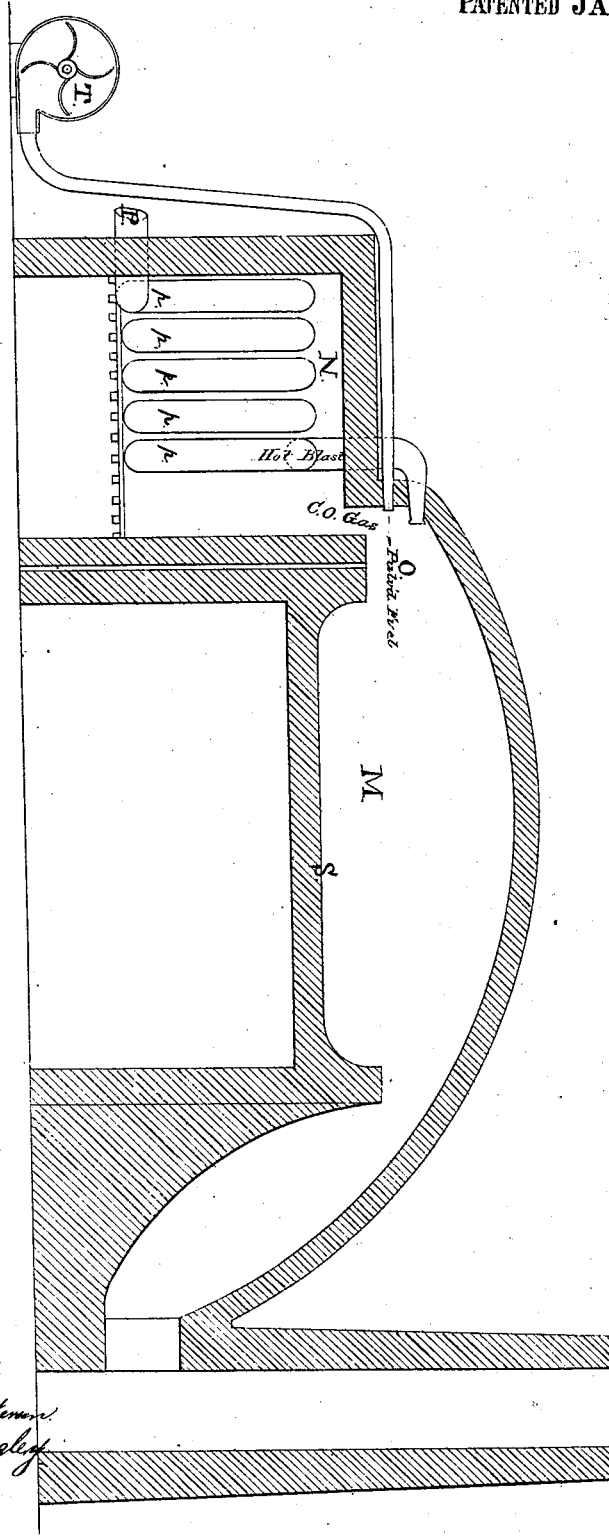

JAMES D. WHELPLEY AND JACOB J. STORER, OF BOSTON, MASSACHUSETTS.

IMPROVEMENT IN THE MANUFACTURE OF STEEL, STEELY IRON, AND HOMOGENEOUS OR CRYSTALLINE IRON.

Specification forming part of Letters Patent No. 111,504, dated January 31, 1871.

*To all whom it may concern:*

Be it known that we, JAMES D. WHELPLEY and JACOB J. STORER, of Boston, in the county of Suffolk and State of Massachusetts, have made a new and useful Improvement in the Manufacture of Steel, Steely Iron, and Homogeneous or Crystalline Iron; and we hereby declare the following to be a full, clear, and exact description of the same, reference being had to the accompanying drawing, which forms a part of this specification.

Heretofore steel and crystalline or homogeneous iron having steely qualities have been made from wrought or fibrous iron or puddled bar by what is known as the "cementation process," or by melting such iron with cast-iron or with various carbonizing fluxes, or by fusion in covered crucibles.

Steel has also been made by heating bar-iron in a muffle or retort surrounded by carbonaceous gases.

Our invention consists in converting wrought or fibrous iron, such as muck-bar or its equivalent, into crystalline iron or steel by melting it on the hearth of a reverberatory furnace by means of a carbonizing or non-oxidizing flame of high temperature, produced by bringing together carbonaceous gas and hot blast, with or without the addition of pulverized fuel. The effect of this treatment is to fuse the iron, and at the same time give it the character of steel or homogeneous or crystalline iron, its degree of carbonization being determined as hereinafter described.

The following description will enable any one skilled in the arts relating to our invention to make and use the same.

In the drawings, M is a reverberatory furnace, and N a gas-generator and blast-heating apparatus combined. This form of gas-generator and heating apparatus is our invention, and is the subject of another application for a patent made by us.

The cold air enters at P, and passing through the pipes *p p p* is heated. At O the gas from the gas-generator is mingled with the hot air from the pipes *p p p*, and, when desired, a jet of pulverized fuel is mingled with the gas and hot air.

Instead of the method of producing heat shown in the drawing, that described in our Patent No. 109,785, dated November 29, 1870, may be used.

The machine for feeding pulverized fuel may be that described in our several patents relating to that subject, or any other suitable apparatus for injecting such fuel into a furnace. The special point required is that a flame of sufficiently high temperature to melt or soften wrought or bar iron must be applied, and it must be so charged with carbon as to prevent the oxidization of the metal upon the furnace-hearth, and to promote the absorption by the metal of carbon, either in the solid form or in that of oxide of carbon, or both.

In the drawing, the machine T for injecting pulverized fuel is shown below the level of the point where the pulverized fuel, hot blast, and gas enter the combustion-chamber of the furnace; but it may be placed in any required position; and, instead of one, several flues or tuyeres for conveying the pulverized fuel may be used, as described in our Patent No. 103,695, dated May 31, 1870, and several flues or tuyeres may be used for the distribution of the hot blast and gases.

The form of furnace shown in our Patent No. 101,067, dated March 22, 1870, may be also used instead of the ordinary furnace shown in the drawing, and the method of using the heated gases, as described and claimed in our Patent No. 101,067, dated March 22, 1870, may also be used.

By reference to the drawing it will be seen that the jet of pulverized fuel when used enters between the jet of carbon gas and the jet of hot air, the air-jet being above, so as to prevent an oxidizing-flame from coming in contact with the charge of iron in the furnace.

The hearth S of the furnace must be constructed of the best and most refractory materials for that purpose—such, for instance, as silicious sand thoroughly roasted.

After the heat of the furnace has been raised to the point of melting steel, wrought-iron is charged in (either hot or cold, at will) on the hearth, and distributed over it, so as to be uniformly acted upon by the flame. The hot-air blast is then reduced in quantity, if necessary, and the supply of pulverized fuel, when used, increased, so as to produce a flame containing a constant excess of oxide of carbon. This will be known by watching the charge, which will be oxidized if atmospheric air be in excess.

The direction of the pulverized-fuel jet, when used, should be a little below the horizontal line of the furnace, making a small angle therewith, so as to insure an excess of carbonic-oxide gas upon the charge in the furnace.

The gas-generator should be kept well filled with coal, so as to furnish an abundant supply of carbonic oxide.

Under the influence of the flame produced by either of the processes above mentioned the iron on the hearth is quickly raised to a very high temperature, and in that condition probably absorbs a small amount of carbon or carbonic oxide, or both, so as to assist the fusion and the conversion into crystalline or into homogeneous metal.

When steel of high grade is required the carbonization is aided or completed by the addition of a small amount of cast-iron, or spiegeleisen, or other carbonizing agent, at the same time continuing the furnace process.

The furnace which we have used, and which answers the purpose, is seven feet eight inches by five feet eight inches, measured across the hearth, which has the form of a shallow basin, about three and a half inches deep at the center.

A charge of wrought-iron, (say, one thousand pounds, more or less,) charged in cold, will attain to perfect fusion in about an hour, more or less.

No surface protection to the charge was employed, except the reducing-flame itself, and no carbonizing material was added to the metal except what was contained in the flame.

After melting and boiling a charge for a few minutes, ferro-manganese, or some equivalent purifier for the separation of any oxide of iron, as is the custom in the manufacture of steels and homogeneous irons, may be added, and as soon as the diffusion is complete the metal should be drawn off in the usual manner. The tap-hole for this purpose may be either under the working door, or on the opposite side, or in any other suitable position. By this process there is very little, if any, loss of iron, as the slag produced, when any is produced, resembles ordinary black glass, containing only traces of iron.

Instead of using muck-bar any equivalent fibrous iron may be used, such as puddled blooms, iron sponges, or puddled balls, scrap-iron, and the like.

We are aware that steel and crystalline iron have been produced by dissolving wrought-iron in a bath of cast-iron or steel, and that wrought-iron has been fused in covered crucibles, with or without chemicals, so as to produce like results.

Our process differs both in practice and in method from these. The time required is much shorter than by the crucible or any other process, and the labor insignificant when compared with any of the methods in use for producing steel; and the cost of apparatus, fuel, and appliances is much less than that of any other method with which we are acquainted. In this process hydrogen and hydrocarbons may be used as reducents in combination with the hot-blast and oxide of carbon, and, in point of fact, a small quantity of hydrogen and hydrocarbons must be invariably present in such a process, because of the moisture in all fuels, and air, and the distillation of hydrocarbons from bituminous coals.

The quantity of these may be, of course, increased at will by the use of steam, excess of moisture in the fuel employed, the substitution of wood as a fuel in the gas-generator or fire-box, and other obvious ways.

A fire-box of the usual character may be substituted, with good results, for the gas-generator, and the hot-air pipes be placed in the fire-place or at the other extremity of the furnace, as described in our patent of November 29, 1870; but we much prefer the use of the gas-generator in this connection, for the special reason, among others, that with it it is more easy to insure a continuous supply of carbonic-oxide gas.

Most pig-iron contains sulphur or phosphorus as contaminating elements. To make a good steel or crystalline iron directly from such iron is practically impossible; but the process of boiling or puddling the pig-iron, properly conducted, removes most of these and other impurities, and gives as a result a wrought-iron nearly or quite free from them.

What is known as "scrap-iron" has usually been worked and reworked in furnace or forge several times, each working improving its quality by removing further percentages of its impurities. This cheap and comparatively pure iron is readily melted and converted into crystalline metal by our process without the expensive addition of pig-iron as a carbonizer and solvent, for pig-iron of sufficient purity for such carbonizer or solvent commands a high price, and is not everywhere easily obtainable.

In the Siemens-Martin and some other processes pig or cast iron containing a certain proportion of carbon is first introduced as the base of the metal to be produced, and wrought-iron, or iron comparatively free from carbon, is added, and dissolved or fused with it in sufficient quantities to reduce the percentage of carbon in the combining mass to the point desired.

Our process differs from these in that wrought or fibrous iron, or iron comparatively free from carbon, is alone put into the furnace, and, by the action of the flame, brought, through fusion, to the condition of crystalline or homogeneous iron. We do not know whether in this process there is any positive absorption of solid carbon conveyed by the flame, since it is possible that the small amount of uncombined carbon contained in fibrous or wrought irons may, in this process, combine with the metal, making it steely. Nor is it certain, if we admit that the gases in the flame of the furnace communicate carbon to the metal, that this work is done by the oxide of carbon itself. It may be that the small quantities of hydrocarbons containing hydrogen, which are always present in the flame of a furnace, are the efficient agents of carbonization. If this be true, the process is in some degree analogous with that of the cementation of iron for the production of blister-steel.

The use of pulverized fuel in the above-described process will be in most cases essential, and it can only be omitted in the process where large quantities of hydrocarbon gases and oxide of carbon can be obtained at a very cheap rate.

It is well known that a flame of exceeding intensity can be obtained by burning hydrocarbon gases, with or without oxide of carbon, combined with a jet of heated atmospheric air. A flame of the proper reducing quality and of the proper intensity can thus be obtained for the fusion of wrought-iron.

It is not necessary to describe the methods of obtaining a flame of this character, as they are well known to chemists and metallurgists; but we are not aware that a flame of this character has been applied to the manufacture of steel by the process and in the manner described by us.

By the substitution of pulverized fuel, in great part, for hydrocarbon vapors, the process becomes much more economical and convenient in practice. We should therefore prefer to employ it in nearly all instances.

Having thus described our invention, what we claim, and desire to secure by Letters Patent of the United States, is—

1. The improved process herein described for converting wrought-iron into steel, steely iron, and homogeneous or crystalline metal, consisting in subjecting wrought-iron, on the hearth of a reverberatory furnace, to a flame of high temperature and reducing or carbonizing character, so as to fuse the same, substantially as described.

2. The method described for reducing or fusing bar or wrought iron by charging it on a hearth of a reverberatory furnace, and subjecting it to a flame produced by bringing together a combined jet of hot air and hot gas and pulverized fuel, in the manner and for the purposes substantially as described.

3. The combination, with a hearth of a reverberatory furnace, of jets or openings so arranged as to project into the furnace and over or upon the charge therein, a combined current of hot air and hot carbonaceous gas, with or without pulverized fuel.

4. The apparatus and combinations, substantially as described, for obtaining the results herein specified.

JAMES D. WHELPLEY.
JACOB J. STORER.

Witnesses:
CHARLES M. NICKERSON,
FRED. W. LONGLEY.